United States Patent [19]

Yamamoto et al.

[11] Patent Number: 5,225,824
[45] Date of Patent: Jul. 6, 1993

[54] APPARATUS FOR GENERATING VIDEO SPECIAL EFFECTS

[75] Inventors: Takao Yamamoto; Katsuakira Moriwake; Tetsuro Kato, all of Kanagawa, Japan

[73] Assignee: Sony Corporation, Tokyo, Japan

[21] Appl. No.: 777,135

[22] Filed: Oct. 16, 1991

[30] Foreign Application Priority Data

Oct. 25, 1990 [JP]  Japan .................................. 2-287828

[51] Int. Cl.⁵ ............................................. G09G 1/02
[52] U.S. Cl. ..................................... 340/799; 358/22
[58] Field of Search .............. 340/799, 792, 734, 721, 340/747; 358/22, 182, 183

[56] References Cited

U.S. PATENT DOCUMENTS

| | | |
|---|---|---|
| 4,533,952 | 8/1985 | Norman, III . |
| 4,620,228 | 10/1986 | Mikado . |
| 4,965,844 | 10/1990 | Oka et al. .............................. 358/22 |
| 5,043,713 | 8/1991 | Katsura et al. ....................... 340/747 |

FOREIGN PATENT DOCUMENTS

WO86/06233 10/1986 PCT Int'l Appl. .
2113059 7/1983 United Kingdom .

OTHER PUBLICATIONS

Patent Abstracts of Japan vol. 8, No. 76 (P-266) 7 Apr. 1984 & JP-A-58 219 664 (Sony Corp) 21 Dec. 1983.

*Primary Examiner*—Ulysses Weldon
*Assistant Examiner*—Regina Liang
*Attorney, Agent, or Firm*—William S. Frommer; Alvin Sinderbrand

[57]  ABSTRACT

In an apparatus for processing an input video signal and generating a special effects video image signal, mapping data representative of the destination upon conversion of each pixel of the input video data is stored in a memory, the mapping data is based upon a write address signal which is added with an offset which becomes larger with the lapse of time. A video image conversion is applied to the input video signal based on the mapping data which is read from the memory in response to a read address signal.

3 Claims, 3 Drawing Sheets

APPARATUS FOR GENERATING VIDEO SPECIAL EFFECTS

BACKGROUND OF THE INVENTION

1. Field of the Invention

The present invention relates to a video image processor and in particular to a special effects generating apparatus which applies video image conversion processing to an input video image.

2. Description of the Prior Art

There has recently become popular special effects generating apparatus which is capable of adding various special effects to an input video signal.

An apparatus which is capable of adding special effects to an input video signal converts the input video signal into digital data, stores the digital data in a memory and processes the digital data in the memory. This conveniently adds special effects an the input video signal.

The present assignee discloses in U.S. Pat. No. 4,965,844 and Japanese Unexamined Patent Publication No. Sho 58-219664 a video image conversion apparatus which is capable of adding special effects to an input video signal.

This video image conversion apparatus displays on the screen a video image which is viewed as if an input video image is applied on a three-dimensional curved surface (for example, a cylindrical surface) by converting a television signal into a digital signal. In order to perform a digital video image processing in real time, the three-dimensional curved surface is approximated as an assembly of pseudo curved surfaces by assuming that the three-dimensional surface comprises a multiplicity of polygonal (for example, triangular, parallelogrammatic, trapezoidal) surfaces and mapping is performed so that the two-dimensional video image is split into each pseudo-curved surface.

There is to be considered as a special effect which is to be added to an input video signal, an effect as if a displayed video image were exploded by diffusing the displayed video image.

However, although various apparatuses which provide special effects have been proposed, no apparatus which provides an explosion effect has been proposed and the development of an apparatus for providing such an explosion effect is desired.

Therefore, it is an object of the present invention to provide a special effects generating apparatus which is capable of providing an input video image with a special effect as if the input video image were exploded by diffusing data of each pixel of the input video image toward the periphery of the screen.

SUMMARY OF THE INVENTION

In order to accomplish the above mentioned object, the present invention provides an apparatus for processing an input video signal and generating a special effects video image signal, which comprises: a) a first memory in which said input video signal is stored for video image conversion in accordance with mapping data; b) write address signal generating means for generating a sequence of write address signals in accordance with a sequence of offsets which become larger with the lapse of time; c) read address signal generating means for generating a read address signal; and d) a second memory for storing mapping data representative of the destination upon image conversion of each pixel of the stored input video data based upon said write address signals and for reading out and supplying the stored mapping data to the first memory in response to the read address signal.

DETAILED DESCRIPTION OF THE PREFERRED EMBODIMENTS

Embodiments of a special effects generating apparatus of the present invention will now be described with reference to the drawings.

The special effects generating apparatus provides a displayed video image with an effect in which it appears as if the displayed video image were exploded by diffusing the image block-by-block where each block includes a predetermined number of pixels or by diffusing the image pixel-by-pixel.

Figure 1:
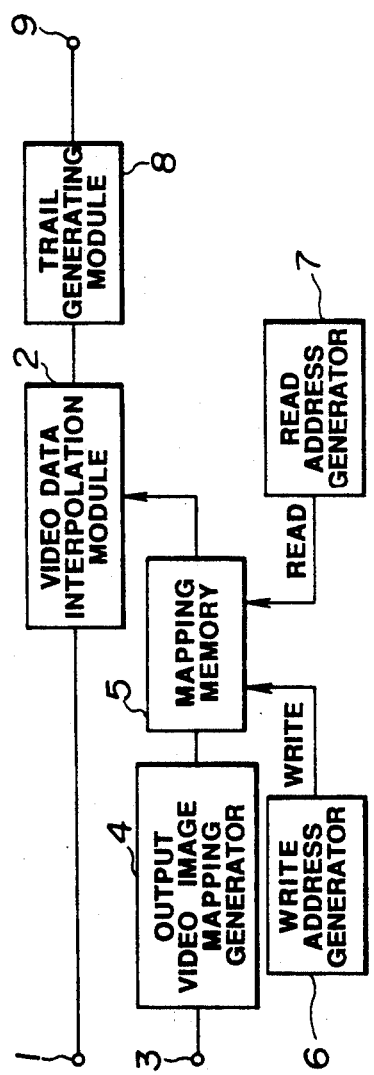
FIG. 1 is a block diagram showing an embodiment of a special effects generating apparatus of the present invention.

Referring now to FIG. 1, video data, which is a digitalized video signal, is supplied to an input terminal 1 of the special effects generating apparatus of the present invention. The video data is then supplied to a video data interpolation module circuit 2 via the input terminal 1. The video data interpolation module circuit 2 has a memory structure. The video data is temporarily stored in the video data interpolation module circuit 2.

Figure 2A:
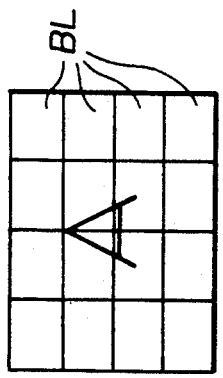
FIGS. 2A through 2F are schematic views for explaining the operation of the special effect generating apparatus shown in FIG. 1.
Figure 2B:
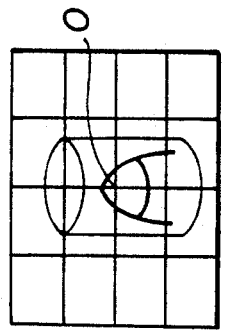
Figure 2C:
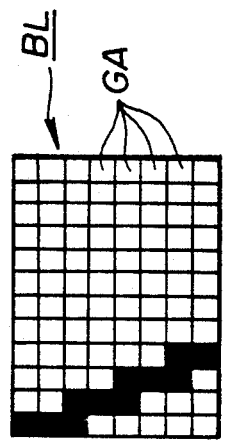

Furthermore, video conversion data representative of a conversion function for each block BL is supplied to an input terminal 3 for a video image conversion as if a two-dimensional video image (a character "A") as shown in FIG. 2A were applied on a three-dimensional object such as a cylindrical prism as shown in FIG. 2B. The three-dimensional object on which the three-dimensional video image is applied may alternatively, include for example a trigonal pyramid, a prism having a parallelogram section or a truncated pyramid. Each block BL comprises, for example, a plurality of pixels GA as shown in FIG. 2C. The video image conversion data which has been inputted to the input terminal 3 is fed to an output video image mapping generator 4.

The output video image mapping generator 4 performs an operation, for example, for converting the two-dimensional video image shown in FIG. 2A into the three-dimensional video image as shown in FIG. 2B, by specifying the destination of each pixel of the two dimensional video image in accordance with the supplied video image conversion data and supplies the operated data as a mapping data to a mapping memory 5 which is a video memory. The mapping data is written into the mapping memory under control of a write address generator 6.

Figure 3:
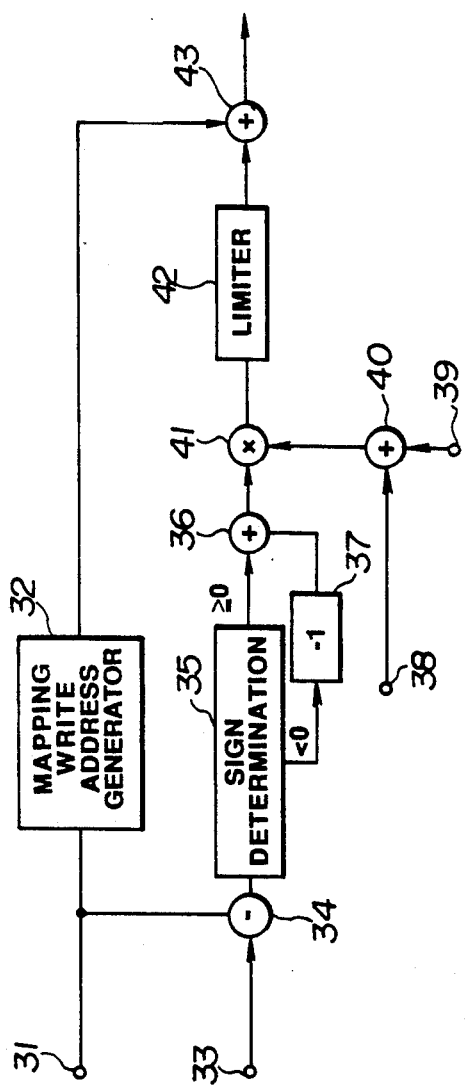
FIG. 3 is a block diagram showing an embodiment of a write address generator of the special effect generating apparatus shown in FIG. 1.

The write address generator 6 performs a write control of the mapping data from the mapping generator 4 and has a structure as is shown in, for example, FIG. 3.

Referring now to FIG. 3, block start coordinate data representative of the start block of each block is supplied to an input terminal 31 from the system controller. The block start coordinate data is supplied to a mapping write address generator 32 and a subtractor 34. The block start coordinate data which has been supplied to the mapping write address generator 32 is supplied to an adder as a mapping address data representative of a write address for each block.

A center position parameter is supplied to an input terminal 33 from the system controller. The center position parameter represents the center position O of the displayed character "A" shown in FIG. 2B which is determined by an operation in the system controller.

The subtractor 34 subtracts the block start coordinate data from the supplied center position parameter and supplies the subtracted data to a sign determining circuit 35. The position of the block is determined by the subtraction operation. If the result of the subtraction of the block start coordinates from the center position parameter shows a positive (+) subtraction data, it is found that the block is positioned on the right side of the center position of the video image. If a negative (−) subtraction data is obtained, it is found that the block is positioned on the left side of the center position of the video image.

The sign determining circuit 35 outputs a sign determining data "+" if the supplied subtraction data is "0" (that is, the center position) or "+" and outputs a sign determining data "0" if the subtraction data is negative. The sign determining data "+" is supplied unchanged to a multiplier 41 via an adder 36 while the sign determining data "0" is supplied to a −1 adding circuit 37. The −1 adding circuit 37 converts the sign determining data "0" into a sign determining data "−1", which is then supplied to the multiplier via the adder 36.

The system controller supplies to an input terminal 38 a diffusion parameter. The diffusion parameter is representative of the shift amount of the block and increases its value with the lapse of time. The system controller also supplies random number data to an input terminal 39. The diffusion parameter and the random number data are supplied to an adder 40.

The adder 40 adds the supplied diffusion parameter with the random number data and supplies the added data to the multiplier 41.

The multiplier 41 multiplies the added data supplied from the adder 36 by the added data supplied from the adder 40 to generate a multiplication data representative of the shift amount of the block in a right or left direction from the center of the displayed video image. The multiplication data is supplied to a limiter 42.

In brief, by subtracting the block start coordination data from the center position parameter, it is determined on which side, negative or positive side, the block is positioned with respect to the center. The position which each block is to be shifted is determined by multiplying the sign, negative or positive, by the diffusion parameter (shift amount) which was added to a random number.

If this diffusion parameter were a constant, that is, the shift amount were a constant, the video image conversion would be visually recognized as only the movement of the blocks. Accordingly, the diffusion parameter is added to the random number data by the adder 40 to make the amount of the movement random. This prevents the movement of each block from becoming visually monotonous and a realistic sensation, as if an actual explosion occurred, can be provided.

If the shift amount of the block is randomly determined by multiplying the diffusion parameter by a random number, an excessive shift amount may be caused by an added random number so that the block cannot be displayed on the screen. If multiplication data which causes the block to be displayed outside the screen is outputted unchanged, the block will be turned back to be displayed on the screen. In order to prevent this phenomenon, the limiter 42 cuts the output of the multiplication data so that no block is shifted to outside of the screen. The multiplication data which has passed through the limiter 42 is supplied to the adder 43.

The adder 43 adds data representative of the write position of each block, supplied from the mapping write address generator 32, with the multiplication data representative of the shift amount of each block which has been randomly determined, and outputs the added data as write address data. The write address data is supplied to the mapping memory 5. The mapping data of each block is written into the mapping memory 5 in accordance with the supplied write address data.

As mentioned above, since the diffusion parameter increases in value with the lapse of time and has been added with a random number data, the mapping data is written into the mapping memory 5 so that diffusion of each block, gradually increases with the lapse of time and is random.

The mapping data which has been written into the mapping memory 5 in such a manner is read out in accordance with a read address from the read address generator 7.

The read address generator 7 randomly specifies the area (one block or a plurality of blocks) among the mapping data written into the mapping memory 5 block-by-block to generate a read address for reading the specified area pixel-by-pixel. The read address generator 7 has a structure as shown in FIG. 4.

Figure 4:
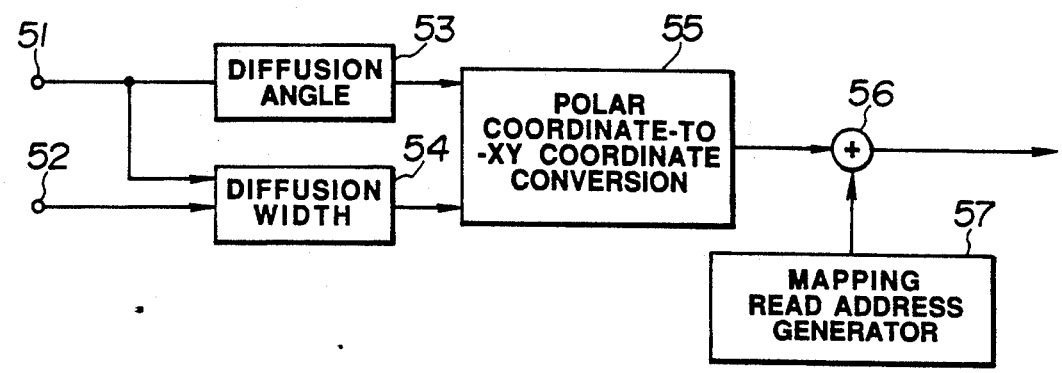
FIG. 4 is a block diagram showing an embodiment of a read address generator of the special effect generating apparatus shown in FIG. 1.

In FIG. 4, random data which is a random numerical value is supplied to an input terminal 51 from the system controller. The random number data is supplied to a diffusion angle circuit 53 and a diffusion width circuit 54 via the input terminal 51.

The diffusion angle circuit 53 randomly determines the diffusion angle of each pixel in accordance with the supplied random number data and supplies the determined diffusion angle data to apolar coordinate-to-XY coordinate conversion circuit 55.

The diffusion width circuit 54 is supplied with a diffusion area parameter which increases with the lapse of time as well as the random number data via the input terminal 52. The diffusion width circuit 54 generates area data which specifies as a diffusion area one or a plurality of blocks and which diffuses each pixel in accordance with a diffusion area parameter which increases its value with the lapse of time and the random number data. The area data is supplied to the polar coordinate-XY coordinate conversion circuit 55.

The polar coordinate-to-XY coordinate conversion circuit 55 converts the polar coordinates which are defined by the diffusion angle data and the area data into XY coordinates and supplies the coordinate converted data to an adder 56.

The adder 56 is additionally supplied with mapping read address data from a mapping read address generator 57, which specifies a pixel to be read with an XY coordinate. The adder 56 generates a read address data having a diffusion angle which is random for each pixel by adding the supplied coordinate conversion data to the mapping read address data. The read address data is supplied to the mapping memory 5.

Although reading of the mapping data from the mapping memory 5 is usually performed by consecutive operation in the memory, for an explosion effect in accordance with the invention, the mapping memory is addressed with a read address data having a random diffusion angle for each pixel. In other words, mapping data each having a random shift amount for each block are stored in the mapping memory 5, the mapping data stored for each block is read with the read address data having a random diffusion angle for each pixel. In such manner, the mapping data which was read out from the mapping memory 5 is supplied to a video data interpolation module circuit 2 in which the video data are stored as offset data which are read address data for performing reading of the video data.

Figure 2D:
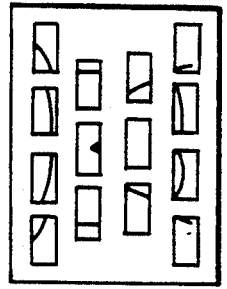
Figure 2E:
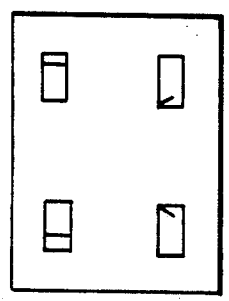
Figure 2F:
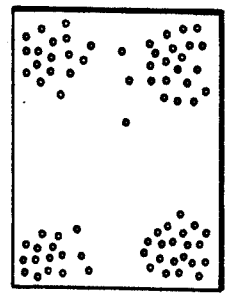

This causes the video image displayed on the screen to be gradually split into segments as shown in FIGS. 2D through 2E. The segments are then diffused. Finally, each of the segments split into pixels and is shift outside the screen. The diffusion speed of the displayed video image is made variable by adjusting the diffusion area parameters supplied from the system controller.

However, this explosion effect of the video image provides only two-dimensional diffusion of the image. In order to provide a three-dimensional explosion effect having sensation of depth, video data read from the video data interpolation module circuit 2 is supplied to a trail generating module 8 which provides output at terminal 9.

Figure 5:
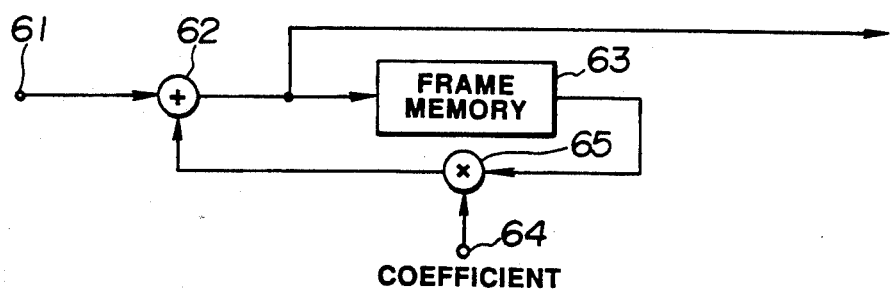
FIG. 5 is a block diagram showing an embodiment of a trail generating module circuit of the special effect generating apparatus shown in FIG. 1.

The trail generating module 8 provides the displayed diffusing video image with an afterimage and is formed as is shown in, for example, FIG. 5.

In FIG. 5, the video data which is read from the video data interpolation module circuit 2 via an input terminal 61 is supplied to the adder 62.

The adder 62 is supplied with multiplication data from a multiplier 64 which will be described hereafter and adds the video data to the multiplication data and outputs the summation data as an video output to a monitor and the like (not shown) and to a frame memory 63.

The summation data which is supplied to the frame memory 63 is temporarily stored therein and is read by the system controller after being delayed by, for example, one frame.

The summation data which is read from the frame memory 63 is supplied to a multiplier 65.

The multiplier 65 is additionally supplied with coefficient data having a given value from the system controller via an input terminal 64. The multiplier 65 multipliers the supplied summation data by the coefficient data and supplies the multiplication data to the adder 62.

As mentioned above, the adder 62 adds the supplied video data to the multiplication data and supplies the summation data to the monitor. This causes the displayed diffusing video image to be added with an afterimage. There is therefore provided an effect to be added with an afterimage. Therefore, an explosion effect having a realistic sensation as if the displayed video image were exploded.

It is apparent from the foregoing that the special effects apparatus is capable of providing an effect as if the displayed video image were exploded by a process comprising the steps of converting input/output video data of, for example, a two-dimensional video image, writing the converted data into the mapping memory 5 block-by-block with write address data which becomes larger with the lapse of time, reading the written mapping data in pixel-by-pixel with read address data which becomes larger with the lapse of time and reading the video data from the video data interpolation circuit 2 in which the read mapping data are stored as read address data.

Furthermore, the gradually diffusing displayed video image can be added with an after-image by supplying the trail generating module 8 with the video data which are read from the video data interpolation module circuit 2. A video image which has a more realistic explosion effect can thereby be displayed.

Since a video image with an explosion effect can easily be displayed, the time which is required for editing the video data can be considerably reduced and the special effects apparatus becomes relatively easy to use.

An offset which becomes larger with the lapse of time may be added to the read address in the read address generator 7 and the added read address may be supplied to the mapping memory 5.

Although in the description of the apparatus as given above, a two-dimensional video image is converted into the three-dimensional video image before providing an explosion effect, it will be appreciated that the explosion effect may be added without converting the two-dimensional video image into a three-dimensional video image.

The special effects generating apparatus of the present invention is capable of providing an explosion effect in which the displayed video image is diffused with the lapse of time by supplying a video memory with a write or read address added with an offset which becomes larger with the lapse of time from write or read address generating means, respectively.

Alternatively, an explosion effect in which displayed video image is diffused block-by-block with the lapse of time can be provided by supplying a write or read address which becomes larger block-by-block from the write or read address generating means to the video memory.

Alternatively, an explosion effect in which the displayed video image is diffused in pixel-by-pixel with the lapse of time can be provided by supplying the video memory with a write or read address which becomes larger pixel-by-pixel with the lapse of time.

Alternatively, an explosion effect in which the displayed video image is diffused block-by-block and is also diffused pixel-by-pixel with the lapse of time can be provided by supplying to the video memory a write address (from the write address generating means) which becomes larger block-by-block with the lapse of time and a read address (from the address generating means) which becomes larger pixel-by-pixel with the lapse of time.

Alternatively, by providing adding means to which a video signal read from the video memory is supplied, a frame memory in which is stored a video signal provided as a summation output by the adding means, and multiplying means for multiplying the video signal from the frame memory by a given coefficient and outputting the multiplied video signal, and by adding the video signal read from the video memory with the video signal which has been multiplied by the given coefficient to output the summation signal, the displayed video image which is diffused with the lapse of time can be added with an afterimage. Therefore, there can be provided a realistic effect as if the displayed video image were exploded and the time which is required for editing the video data can be greatly reduced and ease of use of the apparatus enhanced.

What is claimed is:

1. An apparatus for processing an input video signal and generating a special effects video image signal, comprising:

a first memory in which said input video signal is stored for video image conversion processing in accordance with mapping data;

write address signal generating means for generating a sequence of write address signals in accordance with a sequence of offsets which become larger with the lapse of time;

read address signal generating means for generating a read address signal and which includes offset generating means for generating offset data based upon first diffusion data representative of a diffusion distance and second diffusion data representative of a diffusion angle, said first and second diffusion data being based upon random number data, and address generating means for forming said read address signal by adding said offset data to a regularly generated address signal; and a second memory for storing mapping data representative of the destination upon image conversion of each pixel of said stored input video signal based upon said write address signals and for reading out and supplying said stored mapping data to said first memory in response to said read address signal.

2. An apparatus as defined in claim 1 wherein said write address signals are generated pixel-by-pixel.

3. An apparatus as defined in claim 1 wherein said write address signals are generated block-by-block, each block comprising a given number of pixels.

* * * * *